March 28, 1967  J. MICHAELSON ET AL  3,311,520

METHOD OF FORMING TEXTURED LAMINATE SURFACE

Filed Oct. 18, 1965

FIG.1

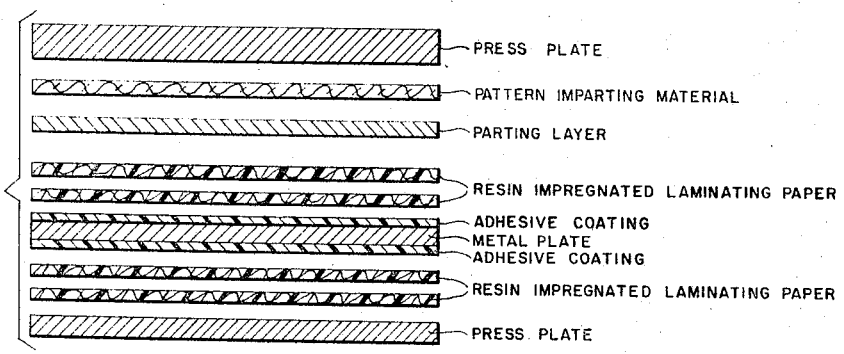

- PRESS PLATE
- PATTERN IMPARTING MATERIAL
- PARTING LAYER
- RESIN IMPREGNATED LAMINATING PAPER
- ADHESIVE COATING
- METAL PLATE
- ADHESIVE COATING
- RESIN IMPREGNATED LAMINATING PAPER
- PRESS PLATE

FIG.1A

- SUPERMASTER
- PARTING LAYER COATING
- RESIN IMPREGNATED LAMINATING PAPER
- ADHESIVE COATING
- METAL PLATE
- ADHESIVE COATING
- RESIN IMPREGNATED LAMINATING PAPER
- PRESS PLATE

FIG.2 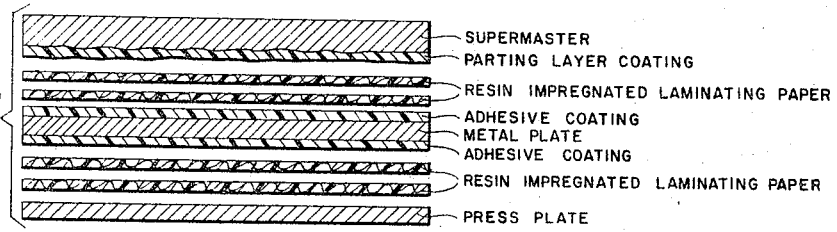 NEGATIVE MASTER

FIG.3

- NEGATIVE MASTER
- PARTING LAYER COATING
- RESIN IMPREGNATED LAMINATING PAPER
- ADHESIVE COATED METAL PLATE
- RESIN IMPREGNATED LAMINATING PAPER
- PRESS PLATE

FIG.4

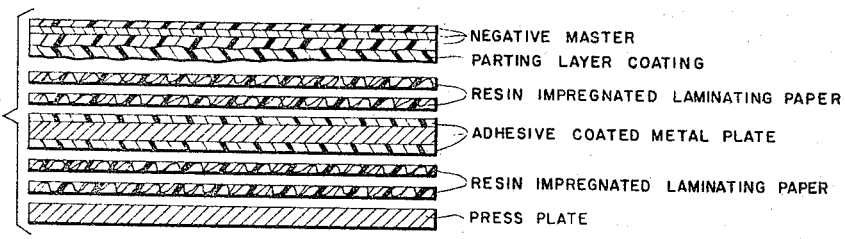

- POSITIVE MASTER
- PARTING LAYER COATING
- RESIN IMPREGNATED LAMINATING PAPER
- ADHESIVE COATED METAL PLATE
- RESIN IMPREGNATED LAMINATING PAPER
- PARTING LAYER COATING
- POSITIVE MASTER

FIG.5 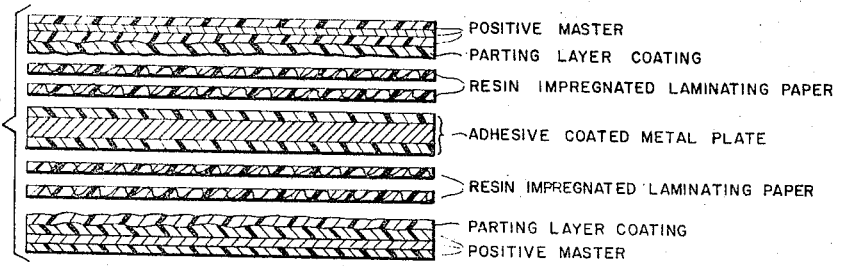  TWO-SIDED NEGATIVE PRESS PLATE

INVENTORS
JACK MICHAELSON
RICHARD C. McDEVITT
HERBERT I. SCHER

BY Karl W. Flocks

ATTORNEY

United States Patent Office 3,311,520
Patented Mar. 28, 1967

3,311,520
METHOD OF FORMING TEXTURED
LAMINATE SURFACE
Jack Michaelson, Baltimore, Richard C. McDevitt, College Park, and Herbert I. Scher, Baltimore, Md., assignors to National Plastic Products Company, Inc., Odenton, Md., a corporation of Maryland
Filed Oct. 18, 1965, Ser. No. 497,426
7 Claims. (Cl. 156—209)

The present invention is a continuation-in-part of application Ser. No. 291,959, filed July 1, 1963.

This invention relates to textured laminate surfaces, and more particularly to method of forming negatively surfaced pressing plate dies utilized in the manufacture of three dimensional surfaced laminates and the dies themselves.

Conventionally, in the manufacture of laminated products consisting of resin impregnated sheets, it is usual to press a plurality or "book" of the impregnated sheets between steel plates under great heat and pressure. These plates are quite adequate for the production of smooth surfaced laminates. However, when it is desired to form laminates having a three dimensional surfaced configuration, the use of such steel dies becomes excessively expensive. Each pattern, and many may be desirable, must be etched or machined into a number of separate steel dies.

It has been proposed to produce such dies out of other materials having the desired configuration, but such production has not been entirely successful. The dies produced by some of these methods do not in turn produce satisfactory laminates. In addition, some of the dies do not lend themselves to effective and economical processing of the laminate products. Furthermore, some of these production methods have not been able to economically produce a plurality of die plates having exactly the same configuration.

Many of the above indicated problems in the prior art have been solved by the procedure disclosed in our copending parent application Ser. No. 291,959. The pressing plates made by such aforementioned process are very inexpensive and yet are capable of satisfactorily forming three dimensional surfaced laminates. However, the pressing plates made by such process have a limited life of about 40 pressings, after which they begin to delaminate and become ineffective for further molding.

It is, therefore, an object of the present invention to obviate the defects and disadvantages of the prior art, such as indicated above.

It is another object of the present invention to provide a method of economically making negatively surfaced pressing plate dies which obviate the above disadvantages.

It is another object of the present invention to provide pressing plate dies which are useful in the manufacture of high pressure decorative laminates with surfaces that contain three dimensional patterns or textures.

It is another object of the present invention to provide for the production of an infinite variety of new surfaces in a convenient and economical manner.

It is another object of the present invention to provide a pressing plate die which is highly effective, has a long life and is very inexpensive.

It is another object of the present invention to provide a method which can produce an indefinite number of pressing plate dies from a single use of an original pattern material.

It is another object of the present invention to prepare a large number of pressing dies with the identical surface configuration.

It is another object of the present invention to provide a method for inexpensively forming a pressing plate die of long life.

It is another object of the present invention to provide pressing plate dies having a negative pattern producing configuration on both surfaces.

It is another object of the present invention to provide the pressing plate dies which have the desirable characteristics of metal dies without their disadvantages.

Other objects and the nature and advantages of the instant invention will be apparent from the following description taken in conjunction with the accompanying drawing wherein:

FIGS. 1–5 show in section a schematic flow representation of the steps of the process of the present invention, FIGS. 1 and 1a being alternate procedures for forming the negative master of FIG. 2.

FIG. 1 shows the formation of a negatively embossed master plate (shown completed in FIG. 2). A plurality of fibrous sheets, preferably four, impregnated with a thermosetting resin such as a phenol-formaldehyde resin, are assembled in a stack with a metal plate therebetween. On top of the stack of resin impregnated laminating paper and the metal plate is placed a parting membrane or layer, which may be formed of any suitable material such as thin gauge aluminum foil, silicone impregnated paper, silicone film, etc. On top of the parting layer is placed a pattern producing sheet which has the surface configuration desired in the ultimate product.

An important feature of the present invention is the provision of a deformation resistant, dimensionally stable metal core in each laminate die. Although the metal plate may be formed of any material, a 20 gauge steel plate is preferably used. Prior to its lamination between the resin impregnated laminating paper, the steel plate must be cleaned to remove all dirt and grease. This is preferably accomplished by washing the steel plate with isopropyl alcohol and then with an aqueous solution of ammonia and detergent. Prior to laminating, the steel plate is then coated on both of its surfaces with a heat activatable, high temperature resistant adhesive. One adhesive which has been found to be particularly effective is a rubber phenolic adhesive (e.g. EC 1359 made by the 3M Company; this adhesive is a nitrile rubber modified phenolic resin dissolved in acetone and methol isobutyl ketone).

It has been surprisingly found that the die surface need not be metal coated but need comprise only paper impregnated with thermoset resin. It would be expected that this material, fragile compared to normal metal high pressure dies, would rapidly deteriorate under repeated high pressure laminating using high pressure and heat, but such has not been found to be the case. The paper and resin surfaced pressing plate dies have been found to be highly resistant to deterioration.

Any thermosetting resin may be used to impregnate the fibrous sheets of paper in place of the phenolic resin. Thus, for example, urea-formaldehyde resin, melamine-formaldehyde resin, epoxy resin, polyester resin or other common resins may be used. While two sheets of resin impregnated laminating paper are shown on either side of the adhesive coated metal plate, it will be recognized that any number of sheets of paper may be used, although the preferred number is two on each side. The fibrous sheets may be formed of any desirable and well known materials such as paper, fabric, wood, woven glass, glass mats or asbestos. Kraft paper is a preferred fibrous sheet material.

The purpose of the parting layer of membrane is to prevent the pattern producing sheet from becoming embedded in and/or adhering to the resin impregnated fibrous sheets as they are being cured. These parting layers may also be used in the later steps of the process for preventing any texture imparting sheet from becoming embedded in phenolic layers being cured, although a parting layer coating, described below, is preferred in these latter steps. The parting layer, utilized in FIG. 1, should be thin enough to allow accurate transmission of the fine details of the texture or pattern and it must be sufficiently strong for removal from the plate or laminate without tearing. The parting layer is preferably formed of aluminum foil of about 1 mil thickness, but may be any metal foil or silicone or polytetrafluoroethylene impregnated parchment paper. These materials are sometimes reuseable in more than one laminating operation.

The pattern producing sheet may be of any material having a pattern which is desirable to reproduce in a laminate. Examples are woven fabrics such as lace, natural and synthetic sheet materials, wood veneer, leather, fiber glass mats, ceramic tile, groove wood paneling, etc.

After assembly, the stack of fibrous sheets with the metal plate therebetween, the parting layer, and the pattern producing sheet are then cured under heat and pressure between a pair of stainless steel pressing plates until a negative master, illustrated in FIG. 2, is produced. The negative master is removed from between the pressing plates, and the parting layer and the pattern imparting material are stripped away leaving the negative master with a negative reproduction of the texture of the pattern imparting material on one of its surfaces thereof.

The negative master may be made in yet another manner as shown in FIG. 1a. In this preferred embodiment, a natural pattern imparting material is not used, but the desired pattern is imparted by utilizing a textured metal plate or supermaster which is etched or embossed with the desired configuration. In this case, the separate parting layer may be eliminated and instead the textured imparting surface of the supermaster may be coated with a suitable non-stick coating. As in the embodiment of FIG. 1, the metal plate is cleaned, coated with suitable adhesive, and interposed between sheets of resin impregnated laminating paper. The resultant stack is then cured under heat and pressure and the resultant negative master may be stripped directly from the supermaster, the parting layer coating having become dissipated during the laminating procedure.

As with the parting layer utilized in FIG. 1, the parting layer coating has the purpose of preventing the supermaster from becoming embedded in and/or adhering to the resin impregnated fibrous sheets as they are being cured. The parting layer coating is also preferably used in the later steps of the process for preventing any texture imparting sheet from becoming embedded in the phenolic layers being cured. These parting layer coatings are applied in a thin layer and allow accurate transmission of the fine details of the texture or pattern. Such a coating may be any heat resistant resinous coating such as a fluorocarbon. Preferably, the parting layer coating comprises a fluorocarbon telomer dispersion (e.g. Vydax AR, made by Du Pont), which is rubbed on, wiped off and dried to obtain a uniform coating. However, any nonstick fluorinated hydrocarbon dispersion, such as polytetrafluoroethylene in a suitable suspending medium, may be used in the same manner.

The negative master of FIG. 2 is shown in FIG. 3 as the upper die member for a second stack of resin impregnated fibrous sheets with a metal core. Here again, the negative master must be coated with a parting layer coating of suitable heat resistant non-stick fluorinated polymer. This assembly is cured under heat and pressure to effect lamination of the resin impregnated laminating paper to the adhesive coated metal plate to thereby produce a positive master. While the negative master is preferably utilized to form a plurality of positive masters, it may be utilized directly as a negative press plate in the manufacture of the ultimate laminates.

After obtention of a plurality of positive masters, these positive masters may be utilized to mold two-sided negative press plates, which in turn are used to form the ultimate product laminate. Each of the positive masters made from the same negative master will, of course, have exactly the same positive surface configuration. This would not be possible using the original pattern imparting material since that sheet is usually rendered unfit for further use by the first laminating operation, and pattern producing sheets are rarely of uniform material, i.e., one sheet of fabric will not be identical in texture to another nor will one piece of wood veneer be identical to another. Similarly, it is not desirable to use and reuse the original supermaster utilized in FIG. 1a, since the supermasters are very expensive, and have a tendency to wear after repeated pressings, so that the pattern etched begins to change.

FIG. 4 shows the production of the final pressing plate die which is to be utilized in the manufacture of three dimensional surface laminates. As shown in FIG. 4, two positive masters are used to squeeze resin impregnated fibrous sheets, with an adhesive coated metal plate therebetween, and thereby produce a two-sided-good pressing plate having identical negative configurations on both surfaces as shown in FIG. 5. Most of the final negatively surfaced pressure plate dies are preferably made with the desired texture on both surfaces so that conventional assemblies or "books" containing a number of laminates can be pressed simultaneously in each press operation, only those pressing plates used on the top and bottom laminates in plural "book" pressings would have the decorative texture on only one surface and these may be made as shown in FIG. 1a, utilizing a positive master coated with parting material in place of the supermaster coated with parting material.

The negative press plates formed by the present invention are highly effective and are dimensionally stable over long usage. Plates made in accordance with the present invention have been subjected to over 250 pressings so far without defect and with no indication of any failure. In addition, these plates are very inexpensive. The metal core improves the image and imparts a smoother surface to the final laminate; this is because preferably only two layers of kraft paper are used on each side of the smooth metal plate, the two layers being insufficient to impart the natural "orange peel" which kraft paper normally imparts.

The following examples are included by way of illustration only and are not to be taken as limiting the invention:

EXAMPLE I

A supermaster, as shown in FIG. 1a, is coated with a dispersion of Vydax AR which is rubbed on by hand and then wiped off and dried to obtain a uniform coating. A 20 gauge steel plate is washed with isopropyl alcohol and then with ammonia containing detergent on both of its surfaces. The metal plate is then coated with EC 1359 adhesive on both surfaces and is then air dried. Two pieces of conventional phenolic impregnated kraft paper are placed on both sides of the steel plate. The supermaster, coated with non-stick fluorocarbon, is placed in facing relation with the top sheet of resin impregnated laminating paper and the assembly is pressed in the normal manner. The assembly is cured for twenty-five minutes under 160° C. and 1000 lbs. per square inch pressure. The assembly is thereby consolidated into a hard laminate having a metal core and phenolic impregnated surface sheets. The resultant negative master has a negative reproduction of the texture of the supermaster on one surface thereof. This negative master is then used to prepare a positive master in accordance with FIG. 3 following the aforementioned operating conditions. This phenolic positive master is then used to press one-side good phenolic press plates.

The phenolic press plates having a negative surface are then used to prepare decorative laminates having a three dimensional surface. This is accomplished by providing a conventional assembly of phenolic impregnated core paper, a melamine resin impregnated pattern sheet and a melamine resin impregnated oversheet stacked in that order. The resin impregnated sheets are then covered with a parting membrane, preferably a silicone resin coated glassine paper of about 2 mils thickness with the silicone coating facing the melamine resin impregnated overlay sheet, and the parting membrane is then covered with the negatively surfaced pressing plate die with its textured surface facing downwardly against the parting membrane. This whole assembly is placed on a metal plate and cured under heat and pressure as is conventional. The finished laminate contains a positive reproduction of the supermaster texture on its surface. If desired, the surface of the resultant laminate may be satinized by rubbing or abrading to remove the gloss therefrom.

EXAMPLE II

The same process as carried out in Example I above is repeated except that a ceramic tile-like surface is used as a pattern imparting material in place of the supermaster. Since the pattern imparting material is essentially non-porous, it may be coated with a parting layer coating similar to that applied on the supermaster; a suspension of polytetrafluoroethylene is therefore coated on the ceramic tile surface and is dried in place. Instead of producing one positive master, two positive masters are produced and both are used to produce a two-side-good phenolic negatively surfaced pressing plate die having a metal core. This die contains a negative reproduction of ceramic tile-like surface on both its sides and will produce a laminate very similar in appearance to mosaic ceramic tile surfaces.

EXAMPLE III

The process of Example I is again carried out except that in place of the supermaster, a wood veneer is laid up in strips with approximately ⅛ inch longitudinal parallel spacing lines between the strips; this is used as the pattern imparting material. A parting layer of silicone coated glassine paper of 2 mils thickness is used. After production of the negative master and a plurality of positive masters, two-side-good negative press plates are produced. These resultant negatively surfaced pressing plate dies not only incorporate the wood graining in its surface but also the raised parallel ridges with a random spacing. These pressing plates are used to press a laminate which incorporates a printed wood grain pattern sheet and which results in a finished product that looks and feels like natural wood paneling, but with the superior surface properties of a high pressure melamine surfaced laminate.

EXAMPLE IV

The procedure of Example I is carried out utilizing other resins in place of the phenolic resin in the kraft paper. The other resins used include epoxy resins, polyester resins, urea-formaldehyde resin and melamine-formaldehyde resins. Each produces a pressing plate die with a satisfactory and resistant surface.

The process of the present invention enables the practical production of a wide variety of surfaces at negligible additional cost since the first plate made as outlined above can be used to reproduce a large number of phenolic plates having metal cores. This procedure would have negligible cost compared to the use of photo-etched, electro-plated and polished metal plates which are extremely expensive. The present process provides that an indefinite number of pressing plates can be made with a single use of the original pattern material, be it cloth, veneer, or a metal plate. The improvement also allows the preparation of a large number of pressing plates with the identical surface. If a pattern had to be used for each plate preparation, when utilizing a destructible pattern imparting material, no two plates would be exactly alike since the pattern would be rendered unfit for further use by the operation and the patterns are rarely of uniform material. Similarly, repeated use of a supermaster would effect changes in its surface configuration which is eliminated by the present invention.

It will be obvious to those skilled in the art that various changes may be made without departing from the scope of the invention and therefore the invention is not limited to what is shown in the drawings and described in the specification but only as indicated in the appended claims.

What is claimed is:
1. In the manufacture of pressing plate dies for the production of three-dimensional surfaced laminates, the process comprising:
(A) providing a negative master having a deformation resistant dimensionally stable metal core and a thermoset resin impregnated fibrous sheet surface having a textured pattern thereon;
(B) coating said negative master with a fluorinated hydrocarbon polymer highly resistant to sticking;
(C) assembling in a stack
  (a) a plurality of fibrous sheets impregnated with a thermosetting resin,
  (b) an adhesive coated deformation resistant, dimensionally stable metal plate, and
  (c) said polymer coated negative master, with said impregnated fibrous sheets (a) being interposed between said coated surfaces;
(D) applying sufficient heat and pressure to the assembly to effect a lamination of said sheets together with said metal plate to thereby produce a positive master;
(E) removing said negative master from said newly formed positive master;
(F) coating said positive master with a non-stick fluorinated hydrocarbon polymer;
(G) assembling in a stack
  (a) a plurality of fibrous sheets impregnated with a thermosetting resin;
  (b) an adhesive coated deformation resistant and dimensionally stable metal plate, and
  (c) said polymer coated positive master, with said impregnated fibrous sheets (a) being interposed between said coated surfaces; and
(H) applying sufficient heat and pressure to the assembly to effect a lamination of said fibrous sheets to said metal plate to thereby produce a negatively surfaced pressure plate die for use in the manufacture of three-dimensional surfaced laminates.

2. A method in accordance with claim 1 wherein said thermosetting resin is phenolic resin.

3. A method in accordance with claim 1 wherein said metal plates are steel plates of approximately 20 gauge.

4. A method in accordance with claim 1 wherein two of said fibrous sheets are positioned on each side of said adhesive coated metal plate.

5. A method in accordance with claim 4 wherein in step (G) two positive masters are utilized, one each side of the impregnated fibrous sheets with the coated metal plate being disposed in the center of said fibrous sheets, in order to produce a pressure plate die negatively surfaced on both sides.

6. A method for manufacturing a laminated mold for repeated uses in laminating procedures in an environment of high pressure and heat, consisting essentially of:
(1) providing a dimensionally stable and deformation resistant metal plate having a smooth surface thereon;
(2) cleaning said smooth surfaced plate to render said smooth surface free of foreign matter;
(3) assembling in a stack
  (a) a plurality of fibrous sheets impregnated with a thermosetting resin,
  (b) said clean and smooth-surfaced metal plate, (c) a layer of high temperature resistant adhesive interposed between said metal plate (b) and the fibrous sheets, and (d) a positively textured pattern imparting element in face-to-face relationship with the fibrous sheet furthest away from said metal plate (b), said pattern imparting element having its surface treated to resist sticking to said fibrous sheets (a);

(4) applying heat and pressure to said assembly to effect lamination of said impregnated fibrous sheets together with said adhesive layer and said smooth-surfaced metal plate; and (5) removing said pattern imparting element from said laminated mold.

7. A method of forming a decorative textured laminate of thermoset resin impregnated fibrous sheets comprising:

(1) providing a laminated die having (a) a pair of negatively textured molding surfaces, each formed of a plurality of resin impregnated fibrous sheets and (b) a flat deformation resistant and dimensionally stable metal core plate backing which is interposed therebetween and adhesively bonded to said resin impregnated sheets; and (2) stacking a plurality of resin impregnated fibrous sheets adjacent said laminated die;

(3) interposing a parting material between said laminated die and said plurality of resin impregnated fibrous sheets; and (4) molding said resin impregnated fibrous sheets stacked adjacent said laminated die at a temperature on the order of 160° C. and under high pressure on the order of 1000 p.s.i. against said laminated die.

References Cited by the Examiner
UNITED STATES PATENTS

| | | | |
|---|---|---|---|
| 1,972,307 | 9/1934 | Loetscher | 156—313 |
| 2,003,752 | 6/1935 | Landt | 161—220 X |
| 2,606,855 | 8/1952 | Jenkins | 156—219 |
| 3,001,900 | 9/1961 | Frieder et al. | 161—115 X |

EARL M. BERGERT, *Primary Examiner.*

H. F. EPSTEIN, *Assistant Examiner.*